(12) United States Patent
Minamizawa et al.

(10) Patent No.: US 8,813,784 B2
(45) Date of Patent: Aug. 26, 2014

(54) FLOW PATH SWITCHING VALVE

(75) Inventors: Hideki Minamizawa, Saitama (JP);
Naoki Kusaka, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 927 days.

(21) Appl. No.: 12/993,357

(22) PCT Filed: May 13, 2009

(86) PCT No.: PCT/JP2009/058890
§ 371 (c)(1),
(2), (4) Date: Nov. 18, 2010

(87) PCT Pub. No.: WO2009/147932
PCT Pub. Date: Dec. 10, 2009

(65) Prior Publication Data
US 2011/0067772 A1 Mar. 24, 2011

(30) Foreign Application Priority Data
Jun. 2, 2008 (JP) .................................. 2008-144227

(51) Int. Cl.
*F16K 15/18* (2006.01)
*F16K 25/02* (2006.01)
*F25B 13/00* (2006.01)

(52) U.S. Cl.
USPC .. 137/625.43; 62/160; 62/324.6; 137/625.46; 251/175; 251/185

(58) Field of Classification Search
USPC ................. 62/160, 324.1, 324.6; 137/625.43, 137/625.46, 625.47; 251/175, 176, 180, 251/185
See application file for complete search history.

(56) References Cited

U.S. PATENT DOCUMENTS 2,598,362 A * 5/1952 Daniels .................... 137/599.15
2,855,000 A * 10/1958 Van Allen et al. ....... 137/625.43

(Continued)

FOREIGN PATENT DOCUMENTS

JP 2002-89739 A1 3/2002
JP 2005-256853 A1 9/2005

(Continued)

OTHER PUBLICATIONS

Machine Translation of Minamizawa et al. (JP 2005-256853) published Sep. 22, 2005.*
International Search Report for International Application No. PCT/JP2009/058890 dated Jul. 7, 2009.

(Continued)

*Primary Examiner* — John K Fristoe, Jr.
*Assistant Examiner* — Frederick D Soski
(74) *Attorney, Agent, or Firm* — Kratz, Quintos & Hanson, LLP

(57) ABSTRACT

A flow path switching valve arranged to rotate a main valve with an auxiliary valve to switch a cooling state and a heating state, which provides a reliable operation of the main valve by simplifying the rotation movement of the auxiliary valve and the main valve and provides reduced switching time. An outdoor heat exchanger-side pressure equalizing hole and an indoor heat exchanger-side pressure equalizing hole are formed at the main valve. An occluding portion for opening and closing of the pressure equalizing holes is formed at the auxiliary valve. The main valve is rotated 90 degrees by merely operating the auxiliary valve along one direction in forward or reverse direction to switch between the cooling state and the heating state.

5 Claims, 12 Drawing Sheets

(56) References Cited

U.S. PATENT DOCUMENTS

| | | | |
|---|---|---|---|
| 3,863,675 A * | 2/1975 | Wiltshire | 137/624.27 |
| 4,139,355 A * | 2/1979 | Turner et al. | 62/324.6 |
| 5,547,344 A * | 8/1996 | Sugiyama et al. | 417/32 |
| 5,690,144 A * | 11/1997 | Takahashi | 137/625.43 |
| 6,164,331 A * | 12/2000 | Sugita et al. | 137/625.43 |
| 6,491,063 B1 * | 12/2002 | Benatav | 137/625.43 |
| 6,505,647 B2 * | 1/2003 | Sasada et al. | 137/625.43 |
| 7,934,695 B2 * | 5/2011 | Sim et al. | 251/129.12 |
| 8,091,380 B2 * | 1/2012 | Chen | 62/498 |

FOREIGN PATENT DOCUMENTS

| | | |
|---|---|---|
| JP | 2006-183802 A1 | 7/2006 |
| JP | 2006-214691 A1 | 8/2006 |
| JP | 4081290 B2 | 4/2008 |

OTHER PUBLICATIONS

Notification of the First Office Action received in corresponding application No. 2009801204022 from the State Intellectual Property Office of the P.R. China dated Mar. 28, 2012 with English translation (13 pages).

* cited by examiner

FIG. 5A
FIG. 5B
FIG. 5C
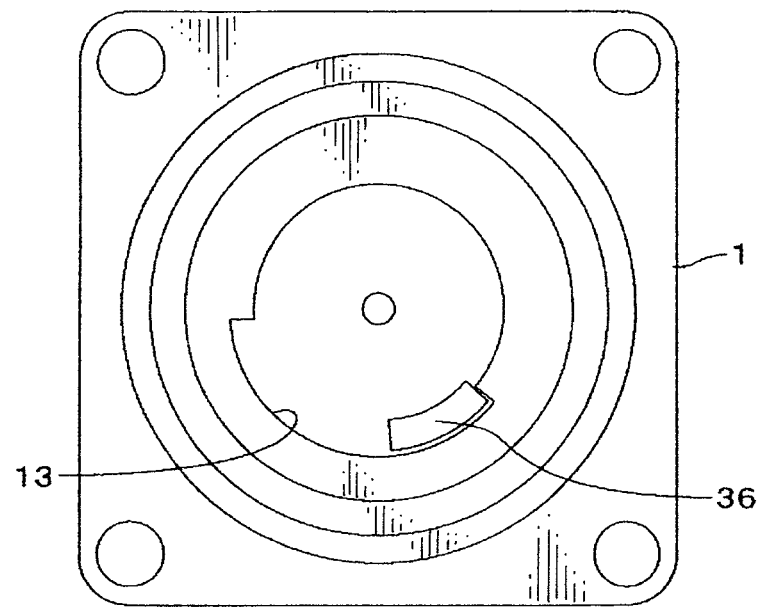
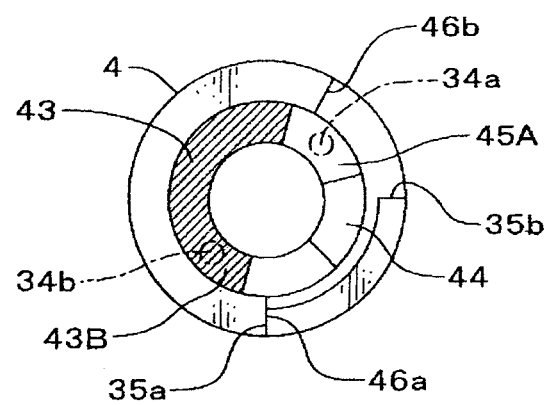
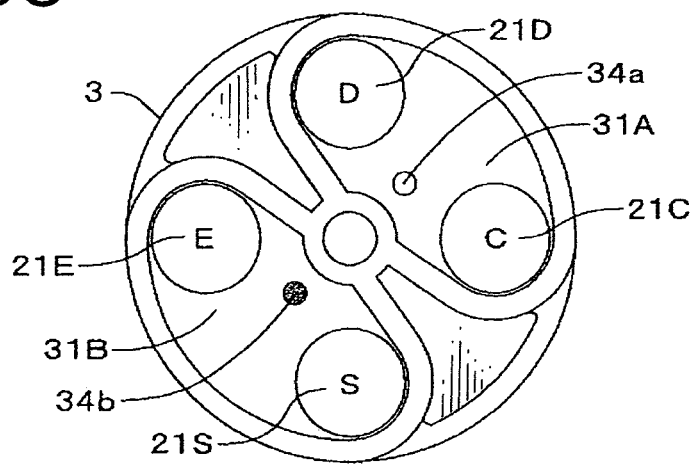

FIG. 12A
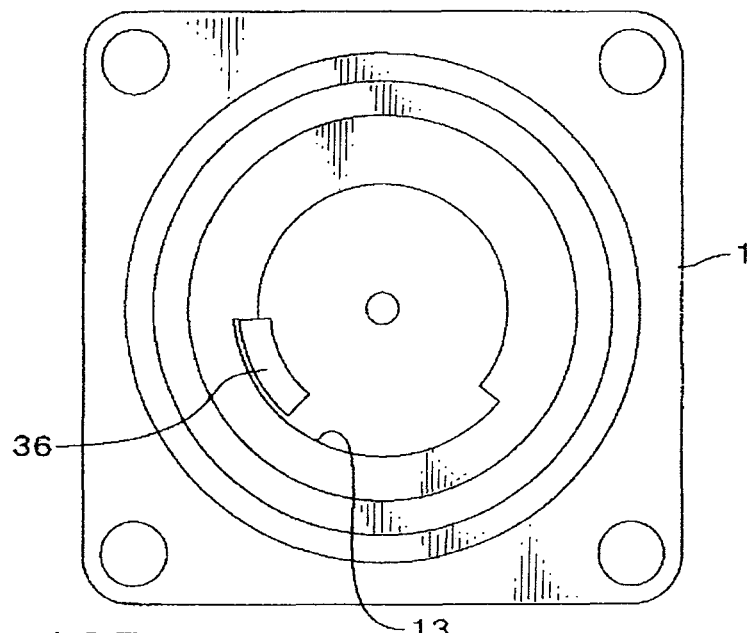
FIG. 12B
FIG. 12C
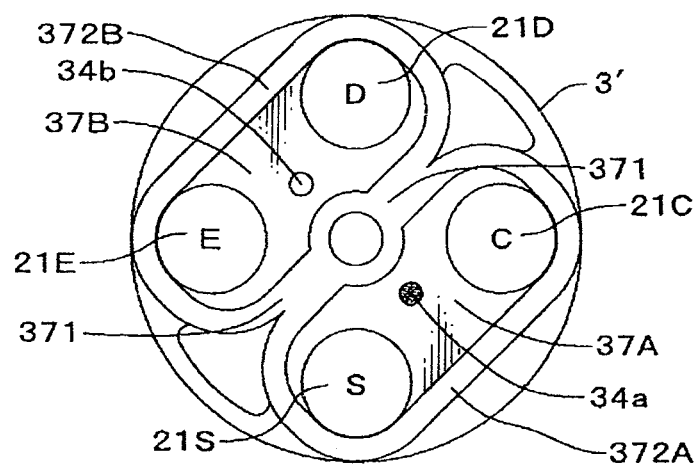

FLOW PATH SWITCHING VALVE

FIELD OF THE INVENTION

The present invention relates to a flow path switching valve for switching a flow path of a cooling medium, which is used for example in a freezing cycle using a heat pump system.

DESCRIPTION OF THE RELATED ART

A conventional flow path switching valve (a four-way valve) of a type described above is disclosed for example in Japanese Patent No. 4081290 (Patent Literature 1). For the flow path switching valve of Patent Literature 1, when switching from a cooling state to a heating state, or from a heating state to a cooling state, a support shaft supporting a main valve is rotatably moved and then a closing valve support member is rotatably moved above the main valve by a drive unit, and the rotation of the closing valve support member opens or closes a connection hole or a pressure equalization hole formed at the main valve. Furthermore, the rotation of the support shaft also rotates, above a valve seat, the main valve together with the closing valve support member. In addition, in a cooling state, the pressure equalization hole is "closed" and the connection hole is "opened" by a first closing valve. Also, in a heating state, the connection hole is "closed" and the pressure equalization hole is "opened" by a second closing valve.

Patent Literature 1: Japanese Patent No. 4081290

SUMMARY OF THE INVENTION

Technical Problem

However, for the flow path switching valve of Patent Literature 1, the main valve moves easily so the main valve is lifted above the valve seat. Thus, in order to switch from the state in which the pressure equalizing hole is "open" and the connection hole is "closed" to the state in which the pressure equalizing hole is "closed" and the connection hole is "open", a motor is required to be inversely rotated for a predetermined angle which may cause the main valve to be move together therewith, leaving a room for an improvement. Furthermore, the closing valve which opens and closes the pressure equalizing hole and the connection hole may move freely with respect to the main valve, leaving a room for an improvement regarding to a sealing performance of the pressure equalizing hole and the connection hole.

Thus, an object of the present invention is to provide a simplified operation of an auxiliary valve to provide a reliable operation of the main valve during a flow path switching in which a flow path of the cooling medium between the cooling state and the heating state of the freezing cycle is switched.

Solution to Problem

The present invention according to a first aspect is a flow path switching valve for switching a direction of flow of a cooling medium for a cooling operation and a heating operation, having: a case member forming a cylindrical valve chamber; a valve seat arranged at an open end portion of the case member; a main valve arranged so as to slidably move in a direction of an axis of the valve chamber and about a valve axis; and a rotary drive unit for rotatably moving the main valve about the valve axis, wherein the valve seat includes four ports which are communicated with a discharge-side of a compressor, an intake-side of the compressor, an outdoor heat exchanger-side and an indoor heat exchanger-side, wherein the main valve includes: an outdoor heat exchanger-side communication path which selectively allows the port provided at the valve seat and communicated with the outdoor heat exchanger-side to communicate with the port communicated with the discharge-side of the compressor or with the port communicated with the intake-side of the compressor; and an indoor heat exchanger-side communication path which selectively allows the port provided at the valve seat and communicated with the indoor heat exchanger-side to communicate with the port communicated with the discharge-side of the compressor or with the port communicated with the intake-side of the compressor, wherein the flow path switching valve further includes: an outdoor heat exchanger-side pressure equalizing hole communicating the valve chamber with the outdoor heat exchanger-side communication path; and an indoor heat exchanger-side pressure equalizing hole communicating the valve chamber with the indoor heat exchanger-side communication path, wherein the main valve is provided with an auxiliary valve abutting portion at the valve chamber side of the main valve, the auxiliary valve abutting portion being arranged to receive a rotary drive of the auxiliary valve, wherein the auxiliary valve is arranged to slidably contact on the main valve and includes an occluding portion for a selectable opening and closing of the outdoor heat exchanger-side pressure equalizing hole and the indoor heat exchanger-side pressure equalizing hole, wherein the flow path switching valve further includes a main valve abutting portion for rotating the main valve, and wherein for a switching from the cooling operation to the heating operation, the main valve is rotatably moved while the outdoor heat exchanger-side pressure equalizing hole is closed and the indoor heat exchanger-side pressure equalizing hole is open, and for a switching from the heating operation to the cooling operation, the main valve is rotatably moved while the outdoor heat exchanger-side pressure equalizing hole is open and the indoor heat exchanger-side pressure equalizing hole is closed.

The present invention according to a second aspect is the flow path switching valve described above, wherein the main valve extends diametrically from a shaft receiving portion at a center and includes a partition portion separating the outdoor heat exchanger-side communication path from the indoor heat exchanger-side communication path, wherein the main valve is arranged so that in a position in which the main valve is rotated for about half of a rotation range during a switching process from the cooling operation to the heating operation, the outdoor heat exchanger-side communication path and the indoor heat exchanger-side communication path are partially overlapped on the port communicated with the discharge-side of the compressor and on the port communicated with the intake-side of the compressor, respectively.

The present invention according to a third aspect is the flow path switching valve described in the first aspect, wherein the main valve includes an outdoor heat exchanger-side path outer wall as an outer wall of the outdoor heat exchanger-side path and an indoor heat exchanger-side path outer wall as an outer wall of the indoor heat exchanger-side path, wherein the main valve is arranged so that the switching process between the cooling operation and the heating operation, the outdoor heat exchanger-side path outer wall crosses an opening of the port communicated with the outdoor heat exchanger-side, and the indoor heat exchanger side path outer wall crosses an opening of the port communicated with the indoor heat exchanger-side.

The present invention according to a fourth aspect is the flow path switching valve according to any one of the first to third aspects, further including, an elastic member exerting a force on the occluding portion of the auxiliary valve towards the outdoor heat exchanger-side pressure equalizing hole and towards the indoor heat exchanger-side pressure equalizing hole.

The present invention according to a fifth aspect is the flow path switching valve according to any one of the first to third aspects, wherein the auxiliary valve includes two occluding portions, the one being arranged at the outdoor heat exchanger-side pressure equalizing hole side and the other one being arranged at the indoor heat exchanger-side pressure equalizing hole side, and the auxiliary valve further includes a support portion arranged to lie in the same plane as the two occluding portions.

The present invention according to a sixth aspect is the flow path switching valve of the fifth aspect, wherein the two occluding portions and the support portion are disposed at an equal distance from a valve axis center.

Advantageous Effects of the Invention

According to the flow path switching valve of the first aspect, for the switching from the cooling operation to the heating operation, the main valve is rotatably moved while the outdoor heat exchanger-side pressure equalizing hole is closed and the indoor heat exchanger-side pressure equalizing hole is open, and for the switching from the heating operation to the cooling operation, the main valve is rotatably moved while the outdoor heat exchanger-side pressure equalizing hole is open and the indoor heat exchanger-side pressure equalizing hole is closed. Consequently, prior to a rotation of the main valve together with the auxiliary valve, the outdoor heat exchanger-side pressure equalizing hole is closed and the indoor heat exchanger-side pressure equalizing hole is opened, or the outdoor heat exchanger-side pressure equalizing hole is opened and the indoor heat exchanger-side pressure equalizing hole is closed. Therefore, the auxiliary valve only needs to be rotated in one direction only and thus the auxiliary valve does not need to be rotated in a reverse direction at a time of switching. As a result, a reliable switching can be achieved. Furthermore, the switching operation can be simplified, reducing a switching time.

According to the flow path switching valve of the second aspect, at a position rotated to about a half of the rotation range during the switching process, the high-pressure cooling medium from the port communicating with the discharge-side flows into both of the outdoor heat exchanger-side path and the indoor heat exchanger-side path. Thus, there is only a small seating force involved when the main valve is seated on the valve seat, reducing a friction force between the main valve and the valve seat. Consequently, the switching can be achieved smoothly even while the compressor is operating.

According to the flow path switching valve of the third aspect, in addition to the advantageous effect of the second aspect, since the high-pressure cooling medium flows over the outdoor heat exchanger-side path outer wall and the indoor heat exchanger-side path outer wall and further flows into the outdoor heat exchanger-side communication path and indoor heat exchanger-side communication path, via the port communicated with the outdoor heat exchanger-side and the port communicated with the indoor heat exchanger-side, thus the switching can be achieved even more smoothly.

According to the flow path switching valve of the fourth aspect, in addition to the advantageous effect of the first through third aspects, since the elastic member pushes the occluding portion of the auxiliary valve towards the outdoor heat exchanger-side pressure equalizing hole and towards the indoor heat exchanger-side pressure equalizing hole, the sealing performance of the closed state of the outdoor heat exchanger-side pressure equalizing hole and the indoor heat exchanger-side pressure equalizing hole can be increased.

According to the flow path switching valve of the fifth aspect, in addition to the advantageous effect of the first through third aspects, since the support portion is provided so as to lie in the same plane as the two occluding portions of the auxiliary valve, the tilt of the auxiliary valve with respect to the main valve can be prevented, further increasing the sealing performance.

According to the flow path switching valve of the sixth aspect, in addition to the advantageous effect of the fifth aspect, since the support portion and the occluding portions are arranged at an equal distance from a valve axis center, the rotation of the auxiliary valve can be smooth also.

BRIEF DESCRIPTION OF THE DRAWINGS

FIGS. 5A to 5C are views showing a positional relationship of respective portions of the flow path switching valve during a cooling operation;

FIGS. 12A to 12C are views showing a positional relationship of respective portions of the flow path switching valve during the heating operation;

DESCRIPTION OF EMBODIMENTS

Figure 1:
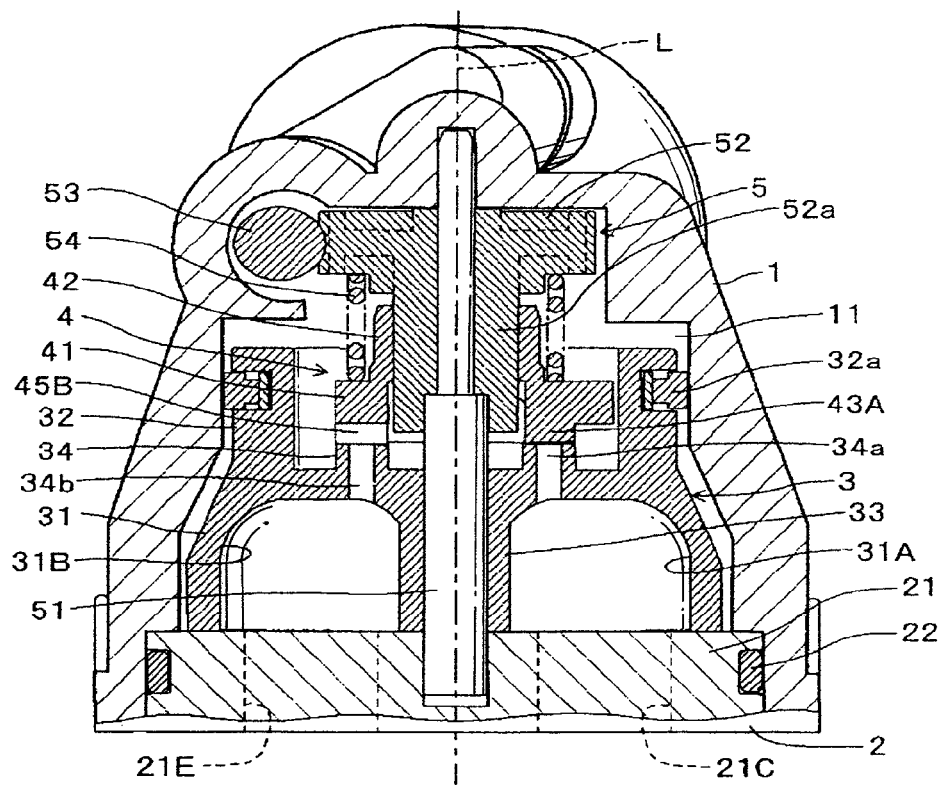
FIG. 1 is a longitudinal sectional view of a flow path switching valve according to a first embodiment of the present invention.
Figure 2:
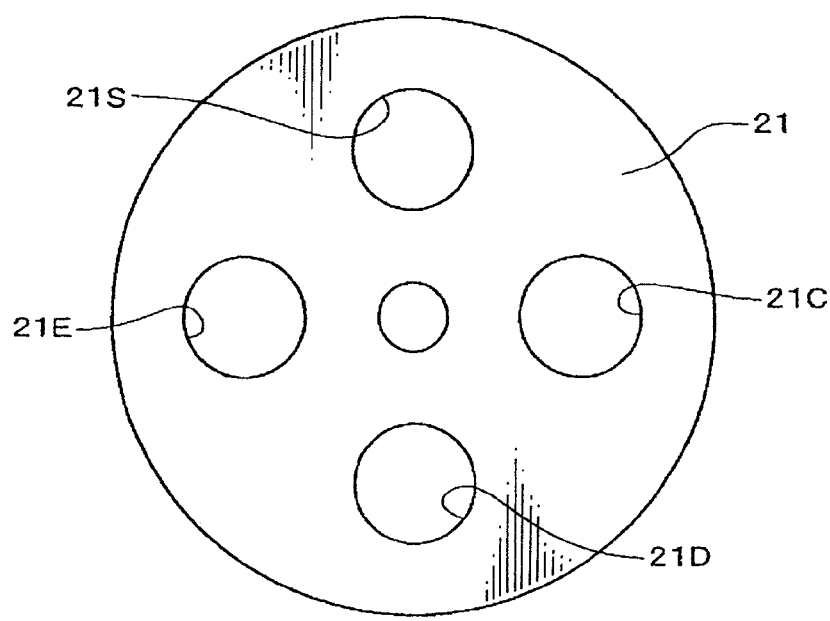
FIG. 2 is a planar view of a valve seat of the flow path switching valve.

The following describes an embodiment of a flow path switching valve according to the present invention with reference to the drawings. FIG. 1 shows a longitudinal sectional view of a flow path switching valve according to a first embodiment of the present invention, FIG. 2 is a planar view of a valve seat of the flow path switching valve, FIG. 3 is a perspective view of a main valve of the flow path switching valve, FIG. 4 is a perspective view of an auxiliary valve of the flow path switching valve, and FIGS. 5 through 7 are views explaining an operation of the flow path switching valve. It is noted that FIG. 1 shows the main valve during which it is being switched.

The flow path switching valve according to the first embodiment includes a case member 1 and a valve seat member 2. The case member 1 is provided with a valve chamber 11 cut and formed into a cylinder-like shape. Furthermore, the valve seat member 2 includes a valve seat 21 having a circular board shape and a ring 22 (refer to FIG. 1) attached to a circumference of the valve seat 21. The valve seat 21 and the ring 22 are fitted to an opening portion of the valve chamber 11, thereby sealing the valve chamber 11. Furthermore, a main valve 3 and an auxiliary valve 4 are received inside the valve chamber 11, and also a drive unit 5 is mounted so as to be provided for a portion from an upper portion of the case member 1 to the inside of the valve chamber 11. In addition, a motor not shown of the drive unit 5 is received at the upper portion of the case member 1.

As shown in FIG. 2, the valve seat 21 is provided with a D port 21D communicated to the valve chamber 11 and to a cooling medium discharge-side of a compressor not shown, a S port 21S communicated to the valve chamber 11 and to a cooling medium intake-side of the compressor, a C selection port 21C communicated to an outdoor heat exchanger-side not shown and a E selection port 21E communicated to an indoor heat exchanger-side not shown, respectively. In addition, these ports open respectively at positions apart by 90 degrees.

As shown in FIG. 3, the main valve 3 is a member made of a resin and having a circular circumference and includes a flared portion 31 near the valve seat 21 and a cylindrical piston portion 32 which are formed in one. A piston ring 32a is arranged at a circumference of the piston portion 32. With a central shaft receiving portion 33 fitted at a lower portion of a rotational shaft 51 of the drive unit 5, the main valve 3 is arranged so as to rotatably move freely around a valve axis L. The flared portion 31 is provided with an outdoor heat exchanger-side communication path 31A and an indoor heat exchanger-side communication path 31B which are bored into a dome-like shape at both sides of the shaft receiving portion 33.

Figure 3A:
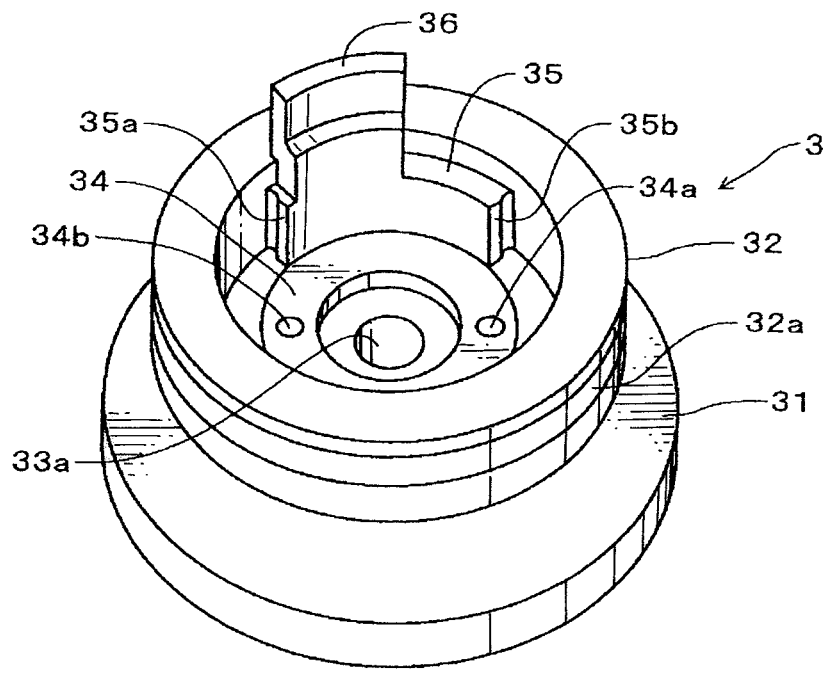
FIGS. 3A and 3B are perspective views of a main valve of the flow path switching valve.
Figure 3B:
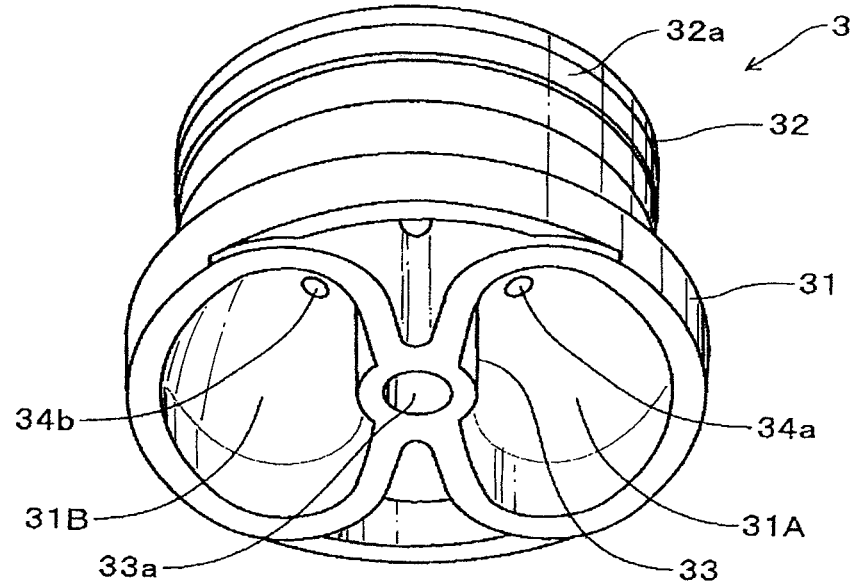
Figure 4A:
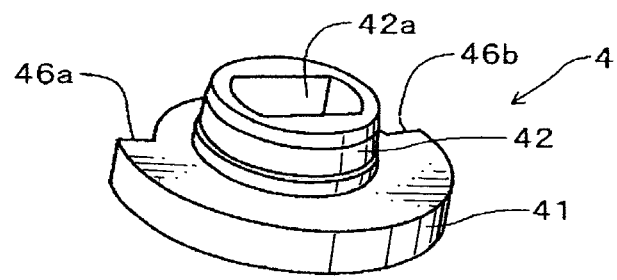
FIGS. 4A and 4B are perspective views of an auxiliary valve of the flow path switching valve.
Figure 4B:
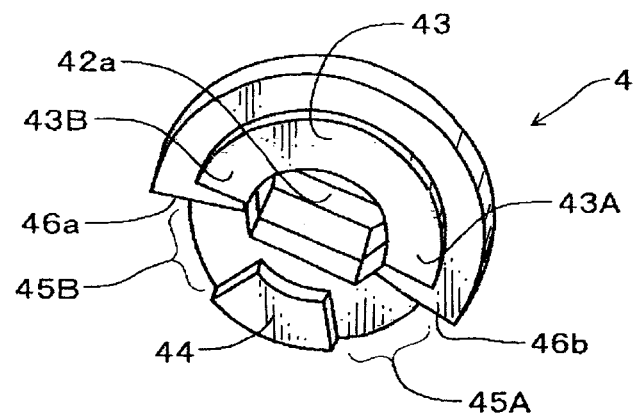

Furthermore, as shown in FIG. 3A, at an inside of the piston portion 32, an auxiliary valve seat 34 is formed at an upper portion of the flared portion 31 so as to project circumferentially around the shaft receiving portion 33 distant from a shaft hole 33a. The auxiliary valve seat 34 is provided with an outdoor heat exchanger-side pressure equalizing hole 34a penetrating from an outdoor heat exchanger-side communication path 31A to the piston portion 32 and an indoor heat exchanger-side pressure equalizing hole 34b penetrating from an indoor heat exchanger-side communication path 31B to the piston portion 32. The outdoor heat exchanger-side pressure equalizing hole 34a and the indoor heat exchanger-side pressure equalizing hole 34b are disposed at 180 degrees apart around the valve axis L.

Furthermore, a projection portion 35 is provided at a portion of an inner circumferential face of the piston portion 32. The projection portion 35 is formed so as to project towards the valve axis L and formed for a range of about 90 degrees. The projection portion 35 is provided with auxiliary valve abutting portions 35a, 35b arranged at both ends thereof along a circumferential direction of the valve axis L, respectively. These auxiliary valve abutting portions 35a, 35b correspond to a later-described main valve abutting portions 46a, 46b of the auxiliary valve 4. Furthermore, a stopper 36 is formed so as to stand perpendicularly from a circumferential portion of an upper portion of the piston portion 32. This stopper 36 is arranged within a guiding groove 13 (refer to FIG. 5A through FIG. 7A) formed circumferentially at an upper portion of the valve chamber 11 of the case member 1, so that both end portions of the stopper 36 are arranged to contact with the end portions of the guiding groove 13 in order to regulate a rotation range of the main valve 3. A difference between an angle between the ends of the guiding groove 13 along a length thereof as well an angle between the ends of the stopper 36 along a width thereof is 90 degrees, thus the rotation range of the main valve 3 is 90 degrees.

As shown in FIG. 4, the auxiliary valve 4 includes a disc-like shaped auxiliary valve main body portion 41 to be received within the piston portion 32 of the main valve 3 and a boss portion 42 provided at a center of the auxiliary valve main body portion 41. A rectangular shaped rectangular hole 42a is formed at a center of this boss portion 42. Furthermore, the auxiliary valve main body portion 41 is provided with a slide valve portion 43 protruding at a face of the auxiliary valve main body portion 41 towards the main valve 3 and protruding in an about 180-degree fan shape. One of both ends of this slide valve portion 43 corresponds to an occluding portion 43A arranged at the outdoor heat exchanger-side pressure equalizing hole-side, and the other one thereof corresponds to an occluding portion 43B arranged at the indoor heat exchanger-side pressure equalizing hole-side. Furthermore, a support portion 44 is formed at a position opposite of the slide valve portion 43 with respect to the rectangular hole 42a. Moreover, on a circumference of a circle of the auxiliary valve 4 around the valve axis L, there are provided two pressure equalizing hole apertures 45A, 45B concaved with respect to the main valve 3—side and arranged between the slide valve portion 43 and the support portion 44. Furthermore, different-leveled portions at an outer circumference of the auxiliary valve main body portion 41 correspond to main valve abutting portions 46a, 46b. Moreover, these main valve abutting portions 46a, 46b lie in the same circumference with the auxiliary valve abutting portions 35a, 35b of the main valve 3.

As shown in FIG. 1, the drive unit 5 includes a worm wheel 52 rotatably arranged at a rotation drive shaft 51 and a worm gear 53 meshed to the worm wheel 52, and this worm gear 53 is fixed at a drive shaft of a motor not shown. Furthermore, the worm wheel 52 is rotatably arranged at the rotation shaft 51 via a boss portion 52a, and this boss portion 52a is fitted to the rectangular shaped rectangular hole 42a formed at the boss portion 42 of the auxiliary valve 4. Consequently, the auxiliary valve 4 is able to slide only in a direction along the valve axis L with respect to the worm wheel 52, while a rotation thereof about the valve axis L is regulated. Moreover, a coil spring 54 as a "force-exerting member" exerting a force on the auxiliary valve 4 towards the main valve 3 is provided between the worm wheel 52 and the auxiliary valve 4, and this auxiliary valve 4 cooperates and rotates with the worm wheel 52.

According to the structure described above, the auxiliary valve 4 is driven by the drive unit 5 and rotated. The main valve 3 rotates together with the auxiliary valve 4 while the main valve abutting portion 46a is abutted on the auxiliary valve abutting portion 35a or while the main valve abutting portion 46b is abutted on the auxiliary valve abutting portion 35b. Furthermore, the stopper 36 of the main valve 3 abuts on the end portion of the guiding groove 13 and the rotation of the main valve 3 stops. In addition, a cooling mode corresponds to abutting on the one end portion of the guiding groove 13 and a heating mode corresponds to abutting on the other end portion thereof. Furthermore, in the cooling mode, the outdoor heat exchanger-side pressure equalizing hole 34a is opened by the pressure equalizing hole aperture 45A of the auxiliary valve 4 and the indoor heat exchanger-side pressure equalizing hole 34b is closed by the occluding portion 43B of the slide valve portion 43. In the heating mode, the indoor heat exchanger-side pressure equalizing hole 34b is opened by the pressure equalizing hole aperture 45B of the auxiliary valve 4 and the indoor heat exchanger-side pressure equalizing hole 34a is closed by the occluding portion 43A of the slide valve portion 43.

The auxiliary valve 4 is pushed towards the main valve 3 by the coil spring 54 (elastic member), and thus the slide valve portion 43 (occluding portion) is pushed against the outdoor heat exchanger-side pressure equalizing hole 34a or the indoor heat exchanger-side pressure equalizing hole 34b, increasing the sealing performance in a closed state of the outdoor heat exchanger-side pressure equalizing hole 34a or the indoor heat exchanger-side pressure equalizing hole 34b. Furthermore, the support portion 44 is arranged to lie in the same plane with the two occluding portions 43A, 43B of the auxiliary valve 4 (a plane of the slide valve portion 43). Therefore, a tilt of the auxiliary valve 4 with respect to the main valve 3 can be prevented, further increasing the sealing performance. Moreover, since the support portion 44 and the occluding portion 43A, 43B are disposed at an equal distance from a center of the valve axis L, the rotation of the auxiliary valve 4 can be smooth.

Figure 6A:
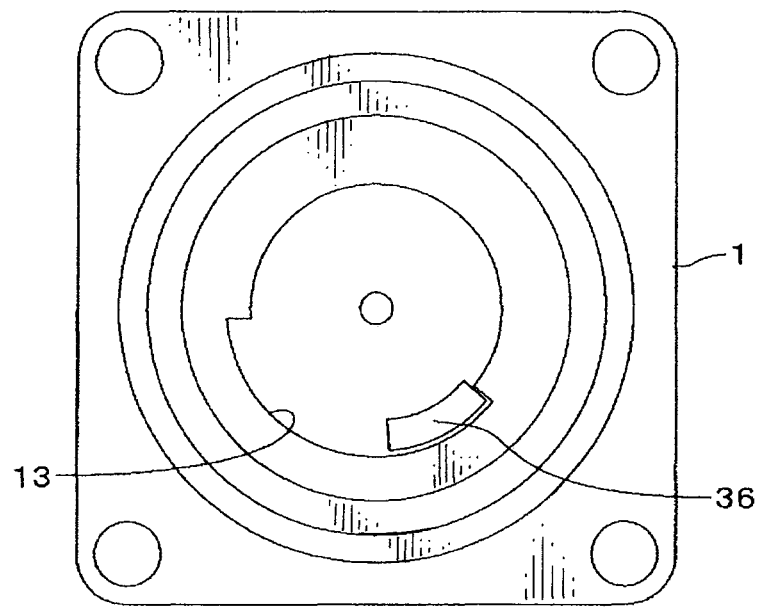
FIGS. 6A to 6C are views showing a positional relationship of respective portions of the flow path switching valve in a switching process.
Figure 6B:
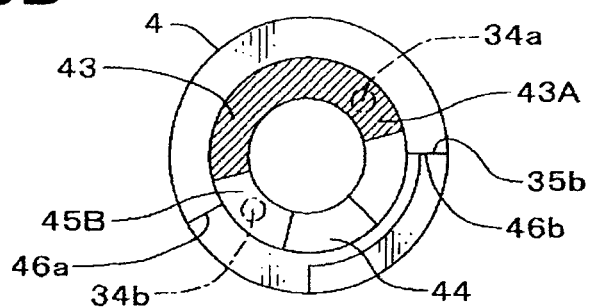
Figure 6C:
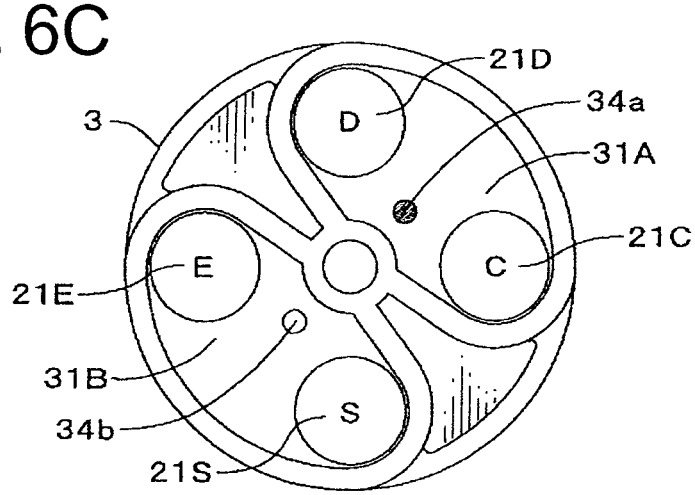
Figure 7A:
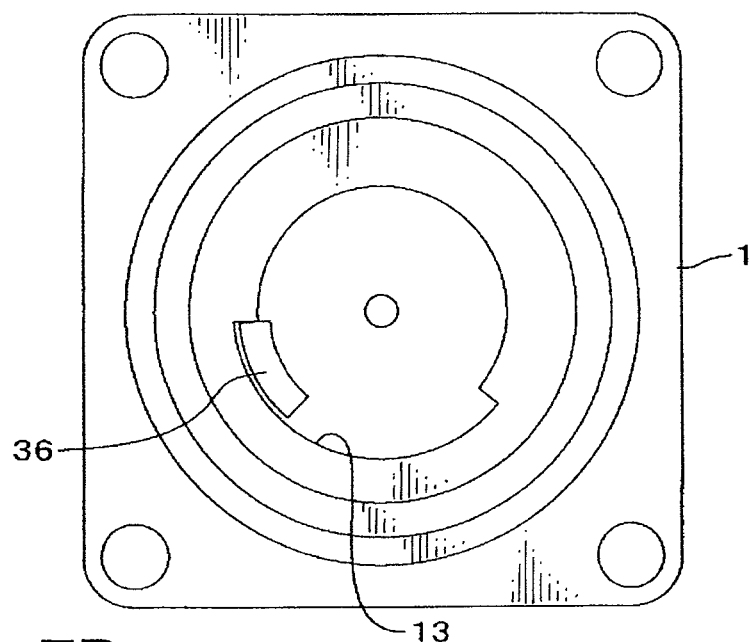
FIGS. 7A to 7C are views showing a positional relationship of respective portions of the flow path switching valve during a heating operation.
Figure 7B:
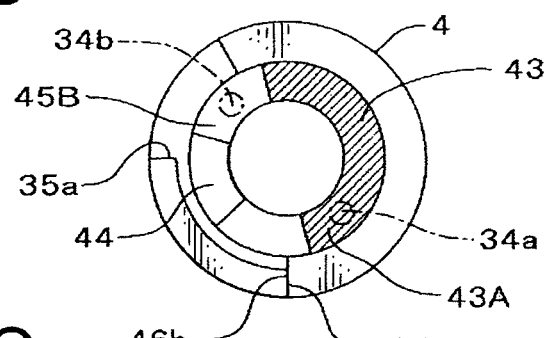
Figure 7C:
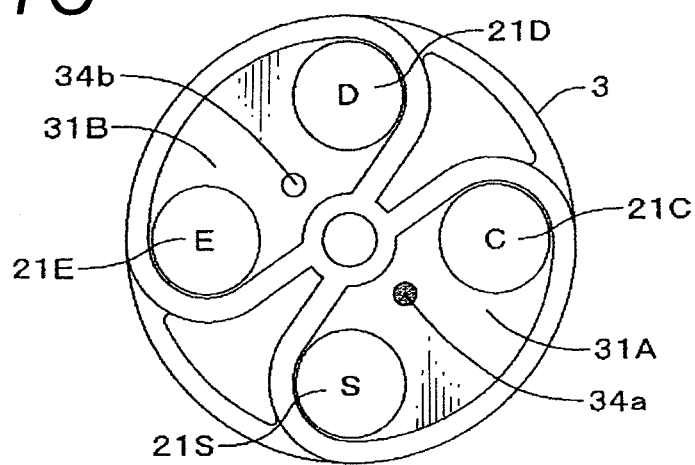

Next, a switching operation of a cooling operation state and a heating operation state is explained in reference with FIG. 5 through FIG. 7. FIG. 5 through FIG. 7 show a positional relationship of the respective portions viewing from the valve seat 21 towards the drive unit 5. Solid lines, dotted lines, diagonal lines and such are not intended to show the anteroposterior position nor the structure. FIG. 5A, FIG. 6A and FIG. 7A show a positional relationship of the guiding groove 13 and the stopper 36 of the main valve, and FIG. 5B, FIG. 6B and FIG. 7B show a positional relationship of the inside of the piston portion 32 and the auxiliary valve 4, and FIG. 5C, FIG. 6C and FIG. 7C show a positional relationship of the main valve 3 and the valve seat 21. Furthermore, FIG. 5 corresponds to the cooling operation state, FIG. 6 corresponds to the switching process of the operation state and FIG. 7 corresponds to the heating operation state.

Firstly, during the cooling operation of FIG. 5, as shown in FIG. 5C, the D port 21D is communicated with the C switching port 21C by the outdoor heat exchanger-side communication path 31A, and the S port 21S is communicated with the E switching port 21E by the indoor heat exchanger-side communication path 31B. In addition, the support portion 44 of the auxiliary valve 4 is slidably contacted on the auxiliary valve seat 34. Due to the high-pressure cooling medium introduced from the D port 21D, a pressure of a space outside the main valve 3 becomes high and a pressure of the indoor heat exchanger-side communication path 31B becomes low. Therefore, the differential pressure acting on the main valve 3 causes the main valve 3 to be seated on the valve seat 21 in a closely contacted manner.

Next, at a time of switching from the cooling operation state to the heating operation state, when the compressor is stopped and the drive unit portion 5 is activated, only the auxiliary valve 4 rotates from a state shown in FIG. 5B in a clockwise direction. At this time, the support portion 44 of the auxiliary valve 4 slidably moves on the auxiliary valve seat 34. Then, the main valve abutting portion 46b of the auxiliary valve 4 abuts on the auxiliary valve abutting portion 35b of the main valve 3 as shown in FIG. 6B, and the indoor heat exchanger-side equalizing pressure hole 34b of the main valve 3 is opened by the equalizing pressure hole aperture 45B of the auxiliary valve 4, while the outdoor heat exchanger-side pressure equalizing hole 34a closed by the occluding portion 43A of the slide valve portion 43 of the auxiliary valve 4. Consequently, a pressure of the valve chamber 11 above the piston ring 32a provided at the piston portion 32 of the main valve 3 gradually becomes low, and the main valve 3 is lifted against the pushing force of the coil spring 54. Therefore, the differential pressure acting on the main valve 3 decreases, and thus the pushing force by the coil spring 54 becomes larger than the lifting force of the main valve 3, thereby the main valve 3 is seated on the valve seat 21.

In addition, at this time, since the main valve abutting portion 46b of the auxiliary valve 4 is abutted on the auxiliary valve abutting portion 35b of the main valve 3, the auxiliary valve 4 rotates together with the main valve 3. Then, the stopper 36 of the main valve 3 abuts on the one end of the guiding groove 13 as shown in FIG. 7A, and the rotation of the auxiliary valve 4 and the main valve 3 is stopped. Then, the compressor is activated to produce the heating operation state. In addition, when the stopper 36 is abutted on the one end of the guiding groove 13, a motor and a drive circuit of the drive unit 5 are overloaded, which can be detected to stop the motor.

In this heating operation state, as shown in FIG. 7C, the D port 21D is communicated with the E switching port 21E by the indoor heat exchanger-side communication path 31B, and the S port 21S is communicated with the C switching port 21C by the outdoor heat exchanger-side communication path 31A. Also, the indoor heat exchanger-side pressure equalizing hole 34b is opened and the outdoor heat exchanger-side pressure equalizing hole 34a is closed. Due to the high-pressure cooling medium introduced from the D port 21D, a pressure of a space outside the main valve 3 becomes high and a pressure of the outdoor heat exchanger-side communication path 31A becomes low. Therefore, the differential pressure acting on the main valve 3 causes the main valve 3 to be seated onto the valve seat 21 in a closely contacted manner. When switching from the heating operation state to the cooling operation state can be achieved by the operation reverse of the above-described operation.

As described above, when switching from the cooling operation to the heating operation, the auxiliary valve 4 is required to be rotated only in one direction. Consequently, the inverse rotation of the auxiliary valve (refer to the aforementioned Patent Literature 1) is not needed, preventing the displacement of the main valve 3.

Figure 8:
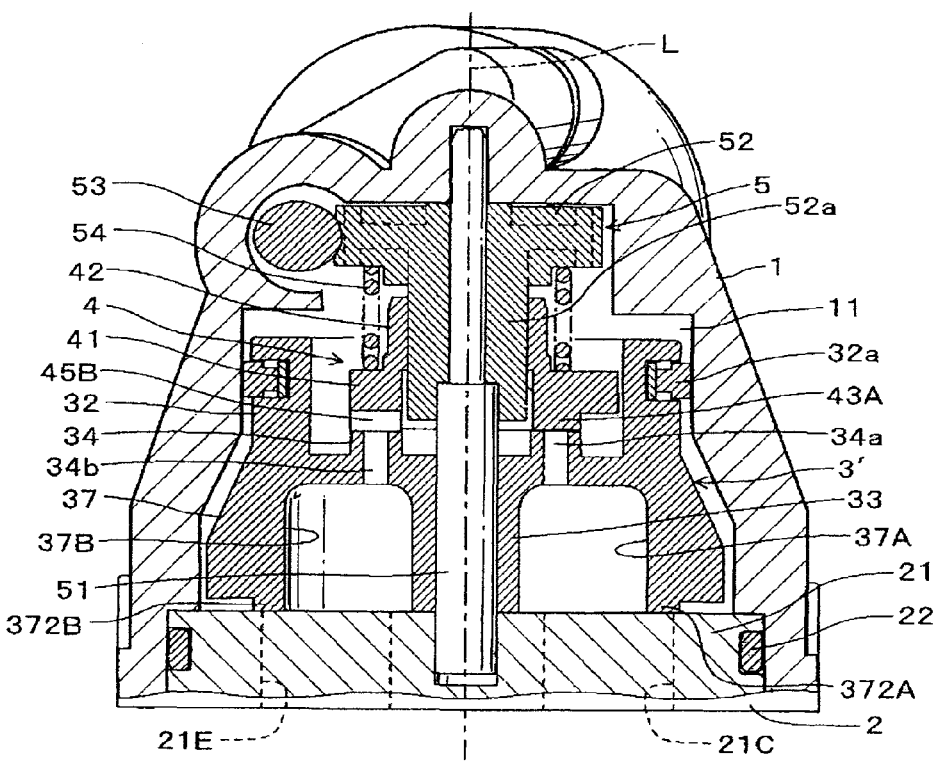
FIG. 8 is a longitudinal sectional view of a flow path switching valve according to a second embodiment of the present invention.
Figure 9:
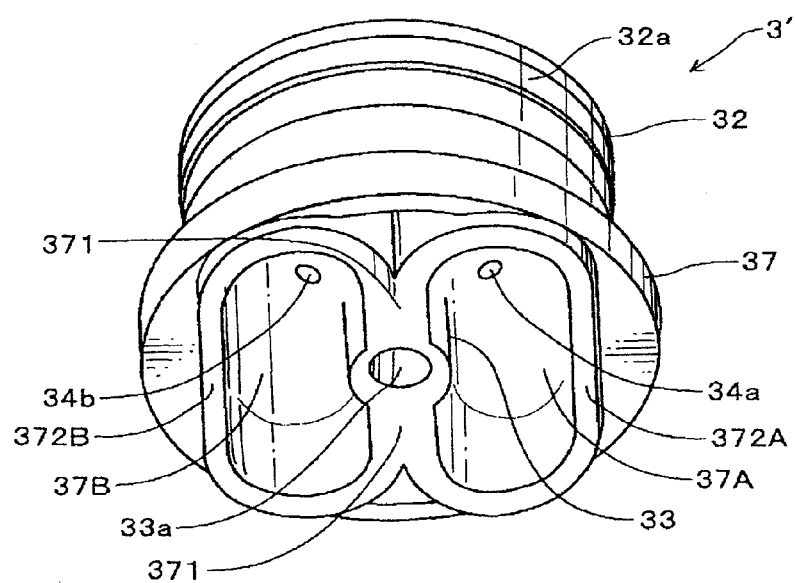
FIG. 9 is a perspective view of a main valve of the flow path switching valve.
Figure 10A:
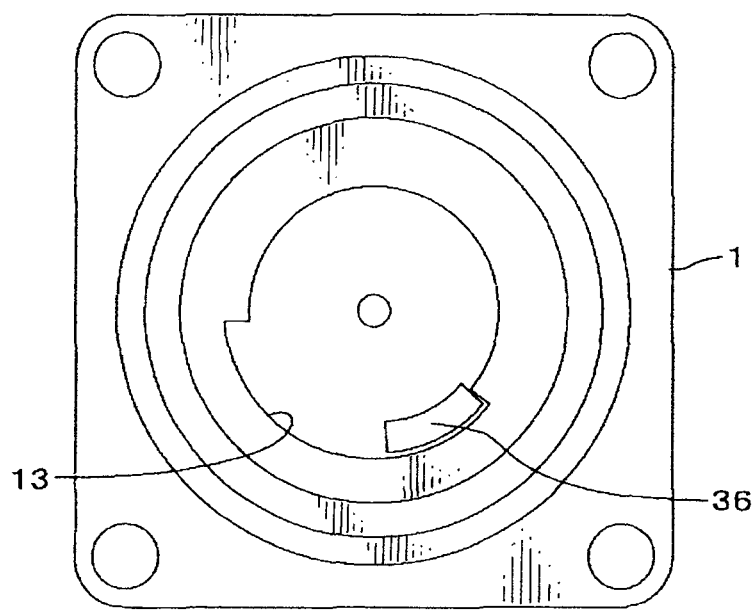
FIGS. 10A to 10C are views showing a positional relationship of respective portions of the flow path switching valve during the cooling operation.
Figure 10B:
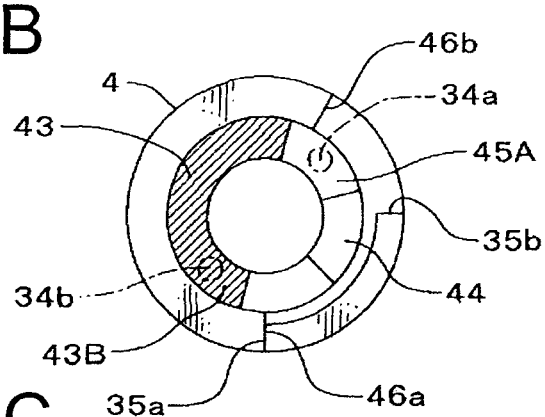
Figure 10C:
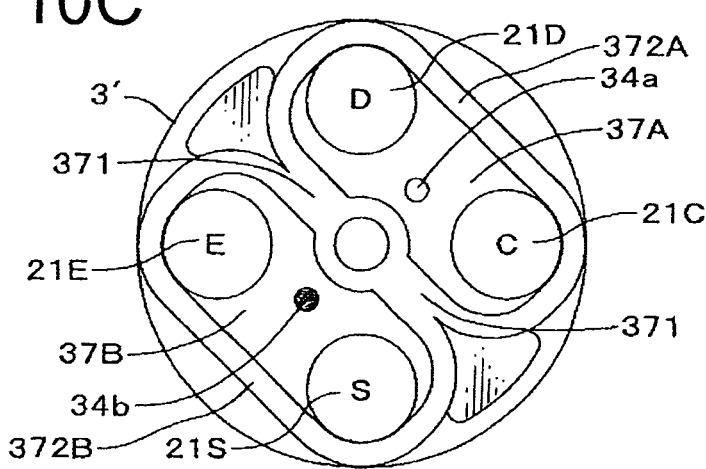
Figure 11A:
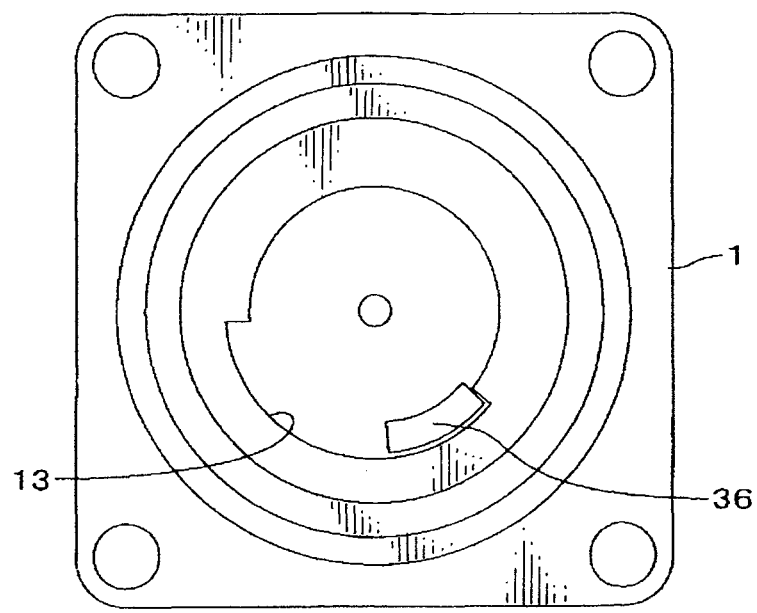
FIGS. 11A to 11C are views showing a positional relationship of respective portions of the flow path switching valve in a switching process.
Figure 11B:
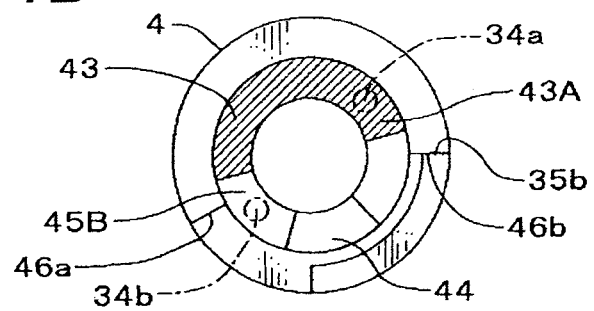
Figure 11C:
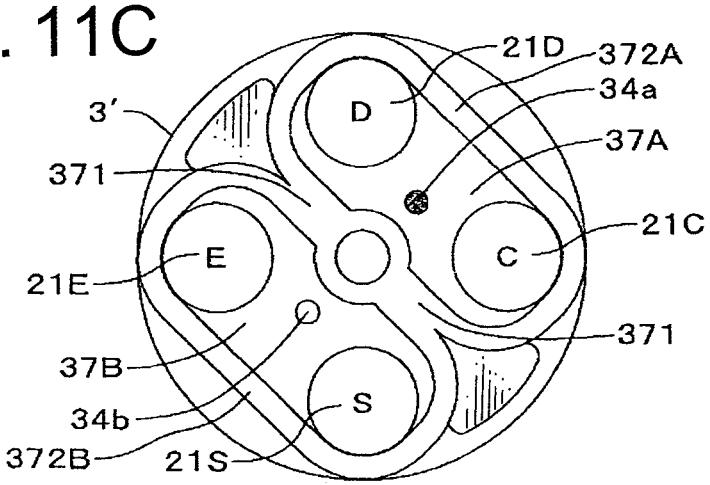
Figure 13A:
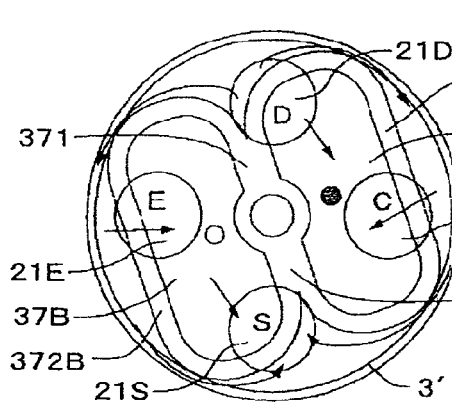
FIGS. 13A to 13D are views showing a flow of a cooling medium for the flow path switching valve in the switching process.
Figure 13B:
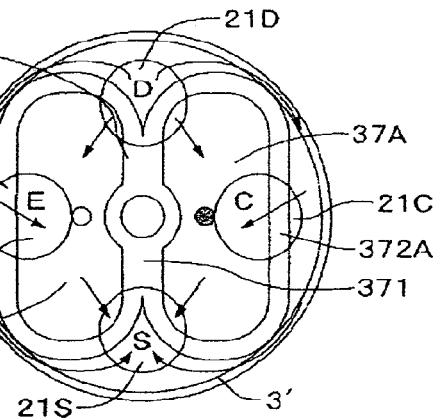
Figure 13C:
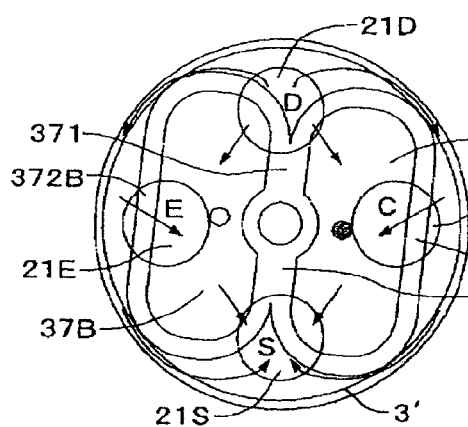
Figure 13D:
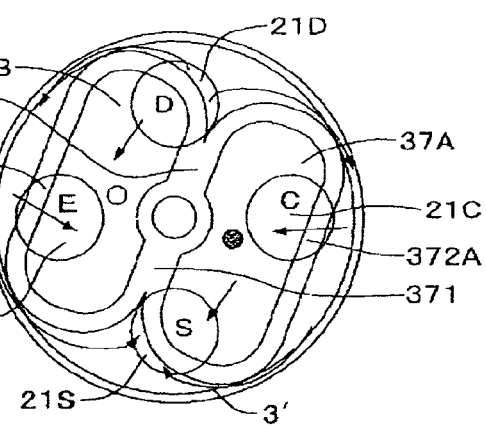

FIG. 8 is a longitudinal sectional view of a flow path switching valve according to a second embodiment of the present invention, FIG. 9 is a perspective view of a main valve of the above-described flow path switching valve, FIG. 10 through FIG. 12 are views explaining the above-described flow path switching valve, in which the components and elements similar to those of the first embodiment are indicated by the same reference sign used in the first embodiment to eliminate the detailed explanation. FIG. 11 is a view showing the main valve in while being switched.

The difference between the flow path switching valve according to the second embodiment and the flow path switching valve according to the first embodiment is the shape of the main valve 3'. As shown in FIG. 9, the main valve 3', similar to that of the first embodiment, is a member made of resin and has a circular circumference, and is constituted of a flared portion 37 near a valve seat 21 and a cylindrical piston portion 32 which are formed in one. The piston portion 32 includes a shaft receiving portion 33, an auxiliary valve seat 34, a projection portion 35 and a stopper 36 having the same structure similar to those in the first embodiment.

The flared portion 37 is provided with an outdoor heat exchanger-side communication path 37A and an indoor heat exchanger-side communication path 37B bored into a dome-like shape at both sides of the shaft receiving portion 33. There is also provided a partition portion 371 extending diametrically from the shaft receiving portion 33, and the outdoor heat exchanger-side communication path 37A is separated from the indoor heat exchanger-side communication path 37B by this partition portion 371. Furthermore, there are provided an outdoor heat exchanger-side communication path outer wall 372A and an indoor heat exchanger-side communication path outer wall 372B extending from an end portion of the partition portion 371 and arranged parallel to the partition portion 371. The outdoor heat exchanger-side communication path outer wall 372A corresponds to an outer wall of the outdoor heat exchanger-side communication path 37A, and the indoor heat exchanger-side communication path outer wall 372B corresponds to an outer wall of the indoor heat exchanger-side communication path 37B.

Similar to the first embodiment, during the cooling operation as shown in FIG. 10, the D port 21D is communicated with the C switching port 21C by the outdoor heat exchanger-side communication path 37A, and the S-port 21S is communicated with the E switching port 21E by the indoor heat exchanger-side communication path 37B. Also, the outdoor heat exchanger-side pressure equalizing hole 34a is opened and the indoor heat exchanger-side pressure equalizing hole 34b is closed. Due to the high-pressure cooling medium introduced from the D port 21D, a pressure of a space outside the main valve 3' becomes high and a pressure of the indoor heat exchanger-side communication path 37B becomes low. Therefore, the differential pressure acting on the main valve 3' causes the main valve 3' to be seated on the valve seat 21 in a closely contacted manner.

At a time of switching from the cooling operation state to the heating operation state, although in the first embodiment the compressor is at a stop, in the second embodiment the switching can be performed without stopping the compressor. First, when the drive unit portion 5 is activated, the auxiliary valve 4 rotates from a state shown in FIG. 10B in a clockwise direction, and the main valve abutting portion 46b of the auxiliary valve 4 abuts on the auxiliary valve abutting portion 35b of the main valve 3' as shown in FIG. 11B. Also, the indoor heat exchanger-side equalizing pressure hole 34b opens and the outdoor heat exchanger-side pressure equalizing hole 34a closes. Consequently, a pressure of the valve chamber 11 above the piston ring 32a provided at the piston portion 32 of the main valve 3' gradually becomes low, and a pressure of a space outside the main valve 3' below the piston ring 32a and a space inside the outdoor heat exchanger-side communication path 37A increase, producing a lifting force by which the main valve 3' is lifted against the pushing force of the coil spring 54. Therefore, the differential pressure acting on the main valve 3' decreases, and thus the pushing force by the coil spring 54 becomes larger than the lifting force of the main valve 3', thereby the main valve 3' is seated on the valve seat 21. It is noted that even in this condition, as explained in reference with FIG. 13, a seating force of the main valve 3' on the valve seat 21 is small.

At this time, since the main valve abutting portion 46b of the auxiliary valve 4 is abutted on the auxiliary valve abutting portion 35b of the main valve 3', the auxiliary valve 4 rotates together with the main valve 3'. Then, the stopper 36 of the main valve 3' abuts on the one end of the guiding groove 13 as shown in FIG. 12A, and the rotation of the auxiliary valve 4 and the main valve 3' are stopped to produce the heating operation state. In this heating operation state, as shown in FIG. 12C, the D port 21D is communicated with the E switching port 21E by the indoor heat exchanger-side communication path 37B, and the S-port 21S is communicated with the C switching port 21C by the outdoor heat exchanger-side communication path 37A. Also, the indoor heat exchanger-side pressure equalizing hole 34b is opened and the outdoor heat exchanger-side pressure equalizing hole 34a is closed. The high-pressure cooling medium introduced from the D port 21D causes a pressure of a space outside the main valve 3' to be high as well as a pressure of the outdoor heat exchanger-side communication path 37A to be low, and thus the main valve 3' is seated onto the valve seat 21 in a closely contacted manner. When switching from the heating operation state to the cooling operation state can be achieved by the operation reverse of the above-described operation.

As described above, also in the second embodiment, the auxiliary valve 4 is required to be rotated only in one direction when switching from the cooling operation to the heating operation. Consequently, the inverse rotation of the auxiliary valve (refer to the afore-mentioned Patent Literature 1) is not in need, preventing the displacement of the main valve 3'.

FIG. 13 is a view explaining in detail a flow of the cooling medium in a switching process according to the second embodiment and shows the switching process from the cooling operation state to the heating operation state. As described above, the rotation of the auxiliary valve 4 causes the main valve 3' to rotate in order according to FIG. 13A through FIG. 13D. FIG. 13B shows a position rotated to half of the rotation range of the switching process, in which the outdoor heat exchanger-side communication path 37A and the indoor heat exchanger-side communication path 37B are partially overlapped with the D port 21D and the S port 21S, respectively. In addition, the outdoor heat exchanger-side communication path outer wall 372A is arranged to cross over an opening of the C port 21C communicated with the outdoor heat exchanger-side, and the indoor heat exchanger-side communication path outer wall 372B is arranged to cross over an opening of the E port 21E communicated with the indoor heat exchanger-side.

Therefore, the high-pressure cooling medium flowing from the D port 21D flows into the outdoor heat exchanger-side communication path 37A and the indoor heat exchanger-side communication path 37B via the D port 21D. Also, the high-pressure cooling medium flowing from the D port 21D flows around the circumference of the main valve 3' and flows into the S-port 21S and flows into the outdoor heat exchanger-side communication path 37A via the C-port 21C, and flows into the indoor heat exchanger-side communication path 37B via the E-port 21E. This cooling medium flows into the outdoor heat exchanger-side communication path 37A and the indoor heat exchanger-side communication path 37B together flow into the S-port 21S. Furthermore, as shown by arrows in FIGS. 13A, 13C and 13D, the condition in which the high-pressure cooling medium flows into the outdoor heat exchanger-side communication path 37A and the indoor heat exchanger-side communication path 37B, and further flows into the S-port 21S, is almost the same for the positions before and after with respect to the half of rotation range.

As described above, since during the switching process the high-pressure cooling medium flows into both of the outdoor heat exchanger-side communication path 37A and the indoor heat exchanger-side communication path 37B, there is only a small force involved when the main valve 3' is seated on the valve seat 21, reducing a friction force between the main valve 3' and the valve seat 21. Consequently, even in a condition in which the compressor is operating, the switching can be achieved smoothly.

Figure 14:
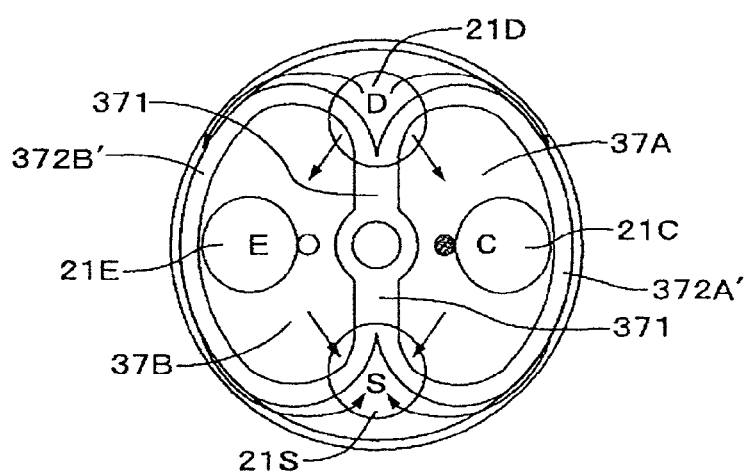
FIG. 14 is a view showing a structure of a main valve of a flow path switching valve according to a third embodiment and a flow of a cooling medium in a switching process.

In the second embodiment described above, in a position of half of the rotation range of the main valve 3' in the switching process and also in a process before and after that, the outdoor heat exchanger-side communication path outer wall 372A and the indoor heat exchanger-side communication path outer wall 372B are arranged so as to cross over the C-port 21C and the E-port 21E, thus the switching can be achieved even more smoothly. However, as shown in FIG. 14, the shape of the outdoor heat exchanger-side communication path outer wall 372A' and the indoor heat exchanger-side communication path outer wall 372B' may be similar to that of the first embodiment. In this case also, the outdoor heat exchanger-side communication path 37A and the indoor heat exchanger-side communication path 37B are partially overlapped on the D port 21D and the S-port 21S, respectively. Consequently, the high-pressure cooling medium flows from the D port 21D into the outdoor heat exchanger-side communication path 37A and the indoor heat exchanger-side communication path 37B, thus the switching can be achieved smoothly even in a condition in which the compressor is operating.

Figure 15A:
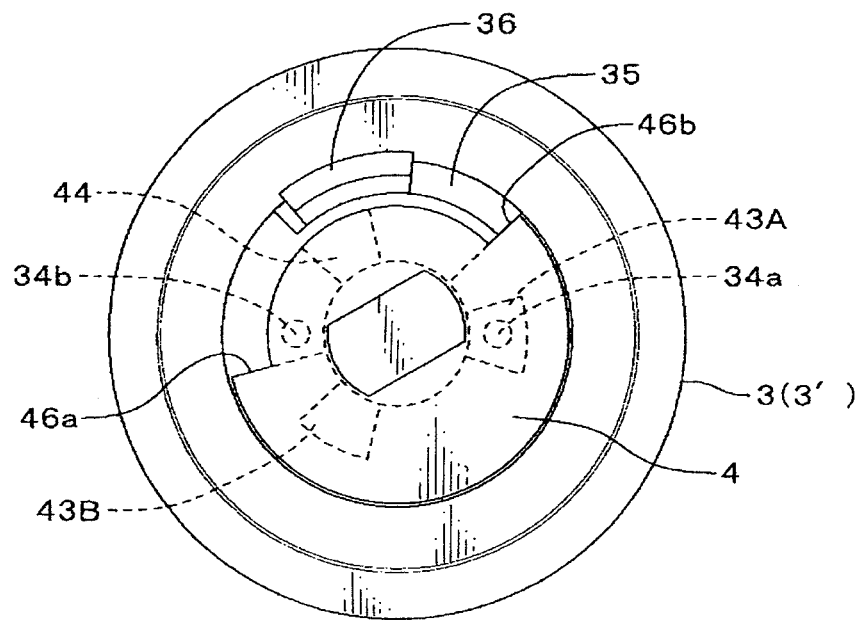
FIGS. 15A and 15B are views showing an auxiliary valve according to another embodiment for the flow path switching valve of the respective embodiments.
Figure 15B:
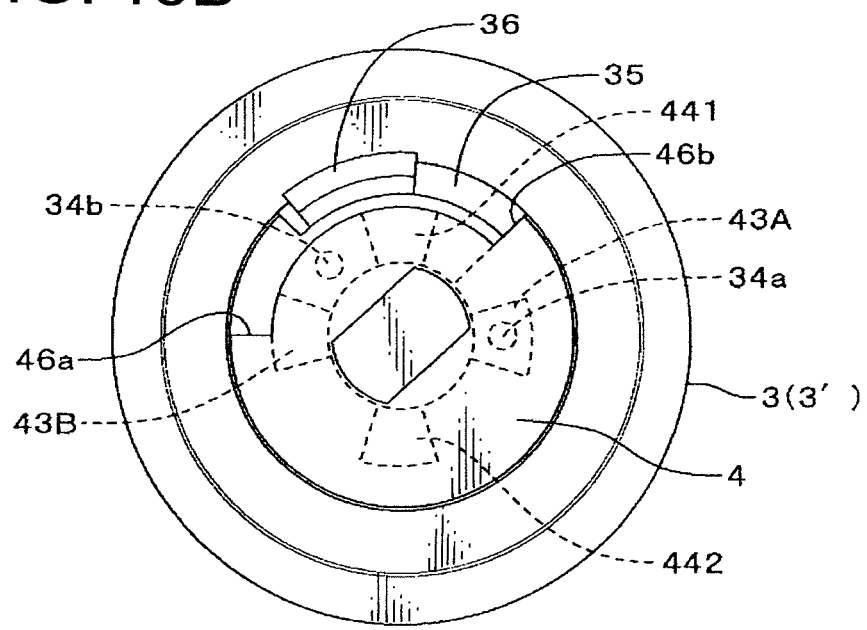

FIG. 15 shows another embodiment of the auxiliary valve 4, in which the auxiliary valve 4 and the main valve 3 (or the main valve 3') are seen from the drive unit 5. Although the occluding portion 43A, 43B is formed by the single slide valve portion 43 in the embodiment described above, the occluding portion 43A and the occluding portion 43B may be formed individually as shown in FIG. 15A. Furthermore, as shown in FIG. 15B, the two occluding portions 43A, 43B may be formed in 180 degrees apart, and two support portions 441, 442 may be formed therebetween. In this case, the position of the outdoor heat exchanger-side pressure equalizing hole 34a and the indoor heat exchanger-side pressure equalizing hole 34b may also be changed according to the rotation range of the auxiliary valve 4 and the position of the occluding portions 43A, 43B.

REFERENCE SIGNS LIST 1 case member
3, 3' main valve
4 auxiliary valve
5 drive unit
11 valve chamber
21 valve seat
21D D port
21S S port
21C C switching port
21E E switching port
31A outdoor heat exchanger-side communication path
31B indoor heat exchanger-side communication path
34a outdoor heat exchanger-side pressure equalizing hole
34b indoor heat exchanger-side pressure equalizing hole
37A outdoor heat exchanger-side communication path
37B indoor heat exchanger-side communication path
371 partition portion
372A outdoor heat exchanger-side communication path outer wall
372B indoor heat exchanger-side communication path outer wall
43A outdoor heat exchanger-side occluding portion
43B indoor heat exchanger-side occluding portion
44 support portion

The invention claimed is:
1. A flow path switching valve for switching a direction of flow of a cooling medium for a cooling operation and a heating operation, comprising:
   a case member forming a cylindrical valve chamber;
   a valve seat arranged at an open end portion of the case member;
   a main valve arranged so as to slidably move in a direction of an axis of the valve chamber and about a valve axis; and
   a rotary drive unit for rotatably moving the main valve about the valve axis,
   wherein the valve seat includes four ports which are communicated with a discharge-side of a compressor, an intake-side of the compressor, an outdoor heat exchanger-side and an indoor heat exchanger-side,
   wherein the main valve includes:
      an outdoor heat exchanger-side communication path which selectively allows the port provided at the valve seat and communicated with the outdoor heat exchanger-side to communicate with the port communicated with the discharge-side of the compressor or with the port communicated with the intake-side of the compressor; and
      an indoor heat exchanger-side communication path which selectively allows the port provided at the valve seat and communicated with the indoor heat exchanger-side to communicate with the port communicated with the discharge-side of the compressor or with the port communicated with the intake-side of the compressor,
   wherein the flow path switching valve further includes:
      an outdoor heat exchanger-side pressure equalizing hole communicating the valve chamber with the outdoor heat exchanger-side communication path; and
      an indoor heat exchanger-side pressure equalizing hole communicating the valve chamber with the indoor heat exchanger-side communication path,
   wherein the main valve is provided with an auxiliary valve abutting portion at the valve chamber side of the main valve, the auxiliary valve abutting portion being arranged to receive a rotary drive of an auxiliary valve,
   wherein the auxiliary valve is arranged to slidably contact on the main valve and includes two occluding portions for a selectable opening and closing of the outdoor heat exchanger-side pressure equalizing hole and the indoor heat exchanger-side pressure equalizing hole,
   wherein one of said two occluding portions is arranged at the outdoor heat exchanger-side pressure equalizing hole side, and another one of said two occluding portions is arranged at the indoor heat exchanger-side pressure equalizing hole side, and
   wherein the auxiliary valve further includes a support portion arranged to lie in the same plane and offset from the two occluding portions, the support portion being configured to support the auxiliary valve on the main valve and prevent a tilt of the auxiliary valve with respect to the main valve,
   wherein the flow path switching valve further includes a main valve abutting portion for rotating the main valve, and
   wherein
   for a switching from the cooling operation to the heating operation, the main valve is rotatably moved while the outdoor heat exchanger-side pressure equalizing hole is closed and the indoor heat exchanger-side pressure equalizing hole is open, and for a switching from the heating operation to the cooling operation, the main valve is rotatably moved while the outdoor heat exchanger-side pressure equalizing hole is open and the indoor heat exchanger-side pressure equalizing hole is closed.

2. The flow path switching valve according to claim 1, wherein the main valve extends diametrically from a shaft receiving portion at a center and includes a partition portion separating the outdoor heat exchanger-side communication path from the indoor heat exchanger-side communication path, and the main valve is arranged so that when the main valve is rotated for substantially half of a rotation range during a switching process between the cooling operation and the heating operation, the outdoor heat exchanger-side communication path and the indoor heat exchanger-side communication path are partially overlapped on the port communicated with the discharge-side of the compressor and on the port communicated with the intake-side of the compressor, respectively.

3. The flow path switching valve according to claim 1, wherein the main valve includes an outdoor heat exchanger-side path outer wall as an outer wall of the outdoor heat exchanger-side path and an indoor heat exchanger-side path outer wall as an outer wall of the indoor heat exchanger-side path, and the main valve is arranged so that the switching process between the cooling operation and the heating operation, the outdoor heat exchanger-side path outer wall crosses an opening of the port communicated with the outdoor heat exchanger-side, and the indoor heat exchanger-side path outer wall crosses an opening of the port communicated with the indoor heat exchanger-side.

4. The flow path switching valve according to any one of claims 1 through 3 further comprising, an elastic member directly exerting a force on the occluding portion of the auxiliary valve towards the outdoor heat exchanger-side pressure equalizing hole and towards the indoor heat exchanger-side pressure equalizing hole.

5. The flow path switching valve according to claim 1, wherein the two occluding portions and the support portion are disposed at an equal distance from a valve axis center.

* * * * *